Patented Jan. 5, 1943

2,307,474

UNITED STATES PATENT OFFICE 2,307,474

MANUFACTURE OF SELENIUM RECTIFIERS

Leslie Ernest Thompson, London, England, assignor, by mesne assignments, to The Union Switch and Signal Company, Swissvale, Pa., a corporation of Pennsylvania No Drawing. Application December 7, 1940, Serial No. 369,129. In Great Britain May 26, 1939

19 Claims. (Cl. 175—366)

This invention relates to the manufacture of selenium rectifiers comprising a metallic base or support covered with a layer or coating composed of or containing selenium.

In the manufacture of rectifiers of this character, the selenium or the like is usually melted and spread over the base or support in a molten condition, its distribution being in some cases assisted by the application of pressure.

According to the principal feature of the present invention, however, the selenium material is distributed over the surface of the base or support in the form of a relatively fine powder which is then heated preferably under pressure to a temperature sufficient to soften the powdered material but considerably lower than the melting point of selenium.

According to a further feature of the invention, a relatively small proportion of a non-volatile salt containing chlorine, such, for example, as sodium chloride or thallium chloride, is added to the selenium material for the purpose of improving or modifying the resistance characteristics of the rectifier.

According to a still further feature of the invention, the powdered material employed is prepared by first melting the selenium with the addition of a proportion of selenium dioxide and in some cases other substances, the molten material being cast, preferably in the form of a relatively thin sheet, and, after cooling, broken up and ground to powder which may be stored until required for use in accordance with the principal feature of the invention.

The present application is a continuation-in-part of my prior application, Serial No. 316,637, filed on January 31, 1940, for the Manufacture of selenium rectifiers.

In order that the nature of the invention may be clearly understood, a preferred process for the preparation of the powdered material will be described by way of example.

Selenium of a high degree of purity (exceeding 99.95% pure) is heated in a vat provided with a porcelain or silica lining to a temperature of approximately 450° C. and the further application of heat then discontinued. Powdered selenium dioxide amounting to approximately 3% of the weight of the selenium and powdered sodium chloride amounting to approximately 0.2% are mixed together and poured on to the surface of the molten material, and the mixture vigorously stirred until the added powder has entirely dissolved.

The molten material is then rapidly poured on to a large table covered with aluminium foil so as to effect the rapid cooling and setting of the material in the form of a sheet of not more than ⅛ inch thick.

The cast selenium containing material in the form thus obtained is relatively hard and vitreous and should present a black glossy appearance, any portions thereof having a grey appearance being removed and returned to the vat for remelting.

The material is now broken up and passed through a grinding mill so as to reduce the material to a powder sufficiently fine to pass through a sieve of 40 to 60 mesh. The grinding mill employed is preferably of the pestle and mortar type with grinding surfaces composed of porcelain as any traces of iron due to the grinding operation are found to affect adversely the rectification characteristics.

The powdered material thus formed may be stored in hermetically sealed containers until required for use as will now be described, or in the manner described in the specification of our copending application, Serial No. 316,608, filed on January 31, 1940, for the Manufacture of selenium and like rectifiers.

In utilising the powdered material for the manufacture of a rectifying element the powder is preferably arranged to be distributed evenly over the roughened surface of a base or support composed of sheet iron which is then subjected in a heated press to a pressure of the order of 750 to 1000 lbs. per square inch at a temperature of approximately 125° C. for approximately 1½ minutes, the element being subsequently annealed at a temperature of approximately 205° C. to 215° C. for a period of from 8 minutes to 40 minutes. The element is then allowed to cool and after the element is dried, a counter-electrode or a contact layer of metal or alloy is applied to the surface of the element in any suitable manner, as for example, by spraying, the element being subsequently subjected to an electric forming process.

The invention is evidently not limited to the process above described by way of example as it is found in practice that the proportion of sodium chloride employed may be varied between 0.1% and 0.3% with almost equally satisfactory results.

Furthermore, by varying the proportion of sodium chloride over a still wider range, it is possible to produce rectifiers having characteristics suitable for different applications or purposes. In general, the lower the proportion of sodium chloride employed, the higher the resistance of the rectifier element in the forward and reverse directions and the higher the critical voltage which can be safely applied to the element in service.

A rectifier element, the selenium layer of which contained 0.05% of sodium chloride, for example, was found to pass a current of the order of 1.0 amp., in the forward direction under an applied voltage of 1 volt, while in the case of an element the selenium layer of which contained 1.00% of sodium chloride, the forward current was of the order of 10 amps., under the same applied voltage.

In cases, therefore, in which the applied voltage is relatively low, the rectifier element may be caused to have a relatively low forward resistance and consequently a high current capacity by the addition of a relatively large proportion of sodium chloride to the selenium. On the other hand, in cases in which the applied voltage is relatively high, the addition of a relatively small proportion of sodium chloride will cause the rectifier element to have a relatively high resistance in the reverse direction, and thus to be capable of withstanding a relatively high applied voltage.

Other non-volatile chlorides may also be employed in carrying the invention into practice, for example, thallium chloride, potassium chloride, barium chloride and lithium chloride, the results obtained as regards the characteristics above indicated being apparently dependent upon the amount of chlorine by weight present in the chloride employed.

In the event that thallium chloride is employed in place of sodium chloride, it is necessary, in order to obtain a halogen content equal to that provided by approximately 0.2% by weight of the sodium chloride, to employ approximately 0.8% by weight of the thallium chloride.

The selenium material prepared in the manner above explained is not only superior to pure selenium as regards the rectifying properties of elements manufactured from this material, but may be stored until required for use, and thus constitutes an intermediate product which may be independently manufactured and utilised in the production of rectifiers on a relatively large commercial scale.

Having thus described my invention, what I claim is:

1. The method of producing a selenium coated member which consists in converting the selenium to the form of a relatively fine powder, distributing the selenium in its powdered form over the surface of the member and then heating the powder to a temperature sufficient to soften it but considerably lower than the melting point of selenium.

2. The method according to claim 1 in which pressure is applied to the powdered selenium while it is being heated.

3. The method as claimed in claim 1 in which a relatively small proportion of a non-volatile salt containing chlorine is added to the selenium prior to heating it for the purpose specified.

4. The method as claimed in claim 1 in which a relatively small proportion of a non-volatile salt containing chlorine is incorporated in the powdered selenium.

5. The method of preparing powdered material for use in selenium rectifier manufacture which consists in melting selenium of a high degree of purity, mixing together selenium dioxide amounting to approximately 3% of the weight of the selenium and powdered sodium chloride amounting to approximately .2% of the weight of the selenium and pouring the mixture onto the surface of the moulten selenium, casting the moulten material in the form of a relatively thin sheet, cooling it, and then breaking it up and grinding it to a powder.

6. The successive steps in the process of manufacturing a selenium rectifier which consists in distributing onto a base plate powdered material prepared according to the process of claim 5 and then heating the material to a temperature sufficient to soften it but considerably lower than the melting point of selenium.

7. The successive steps in the process of manufacturing a selenium rectifier which consists in distributing onto a base plate powdered material prepared according to the process of claim 5 and then heating the material under pressure to a temperature sufficient to soften it but considerably lower than the melting point of selenium.

8. The method of preparing powdered material for use in selenium rectifier manufacture which consists in heating selenium of a high degree of purity to a temperature of approximately 450° C., mixing together selenium dioxide amounting to approximately 3% of the weight of the selenium and powdered sodium chloride amounting to approximately .2% of the weight of the selenium and pouring the mixture onto the surface of the moulten selenium, casting the moulten material in the form of a relatively thin sheet, cooling it, and then breaking it up and grinding it to a powder.

9. The method of preparing powdered material for use in selenium rectifier manufacture which consists in melting relatively pure selenium, pouring onto the moulten selenium a relatively small proportion of a non-volatile salt containing chlorine, casting the moulten material in the form of a relatively thin sheet, cooling it, and then breaking it up and grinding it to a powder.

10. The method of preparing powdered material for use in selenium rectifier manufacture which consists in melting selenium of a high degree of purity, mixing together selenium dioxide amounting to approximately 3% of the weight of the selenium and powdered sodium chloride amounting to approximately .2% of the weight of the selenium and pouring the mixture onto the surface of the moulten selenium, rapidly pouring the moulten material onto a support covered with aluminum foil so as to effect the rapid cooling and setting of the material in the form of a sheet of not more than ⅛ inch thick, and then breaking it up and grinding it to a powder which may be stored in hermetically sealed containers until it is to be used.

11. The method of preparing powdered material for use in selenium rectifier manufacture which consists in melting selenium of a high degree of purity, mixing together selenium dioxide amounting to approximately 3% of the weight of the selenium and powdered thallium chloride amounting to approximately .3% of the weight of the selenium and pouring the mixture onto the surface of the moulten selenium, casting the moulten material in the form of a relatively thin sheet, cooling it, and then breaking it up and grinding it to a powder.

12. The method of manufacturing a selenium rectifier which consists in distributing onto a metal base plate powdered selenium containing a relatively small proportion of a non-volatile salt containing chlorine, subjecting the powdered material to a pressure of the order of 750 to 1000 pounds per square inch at a temperature of approximately 125° C. for approximately 1½ minutes, and subsequently annealing the resulting element at a temperature of approximately 205° C. to 215° C. for a period of from 8 to 40 minutes.

13. The method of manufacturing a selenium rectifier which consists in distributing onto a metal base plate powdered selenium containing a relatively small proportion of a non-volatile salt containing chlorine, subjecting the powdered material to a pressure of the order of 750 to 1000 pounds per square inch at a temperature of approximately 125° C. for approximately 1½ minutes, subsequently annealing the resulting element at a temperature of approximately 205° C. to 215° C. for a period of from 8 to 40 minutes, allowing the element to cool, drying it, applying a counter-electrode or contact layer of metal, and finally subjecting the element to an electric forming process.

14. The method of manufacturing a selenium rectifier which consists in distributing onto a metal base plate powdered selenium material prepared according to the process of claim 5, subjecting the powdered material to a pressure of the order of 750 to 1000 pounds per square inch at a temperature of approximately 125° C. for approximately 1½ minutes, and subsequently annealing the resulting element at a temperature of approximately 205° C. to 215° C. for a period of from 8 to 40 minutes.

15. The method of manufacturing a selenium rectifier which consists in distributing onto a metal base plate powdered selenium material prepared according to the process of claim 5, subjecting the powdered material to a pressure of the order of 750 to 1000 pounds per square inch at a temperature of approximately 125° C. for approximately 1½ minutes, subsequently annealing the resulting element at a temperature of approximately 205° C. to 215° C. for a period of from 8 to 40 minutes, allowing the element to cool, drying it, applying a counter-electrode or contact layer of metal, and finally subjecting the element to an electric forming process.

16. An asymmetric electrode system including a metal base and a coating of selenium containing approximately .8% by weight of thallium chloride.

17. An asymmetric electrode system including a metal base and a coating of selenium containing powdered selenium dioxide amounting to approximately 3% of the weight of the selenium and powdered sodium chloride amounting to approximately .2%.

18. Powdered material for use in selenium rectifier manufacture comprising selenium containing a relatively small proportion of thallium chloride.

19. Powdered material for use in selenium rectifier manufacture comprising selenium containing approximately .8% by weight of thallium chloride.

LESLIE ERNEST THOMPSON.